Figure 1:
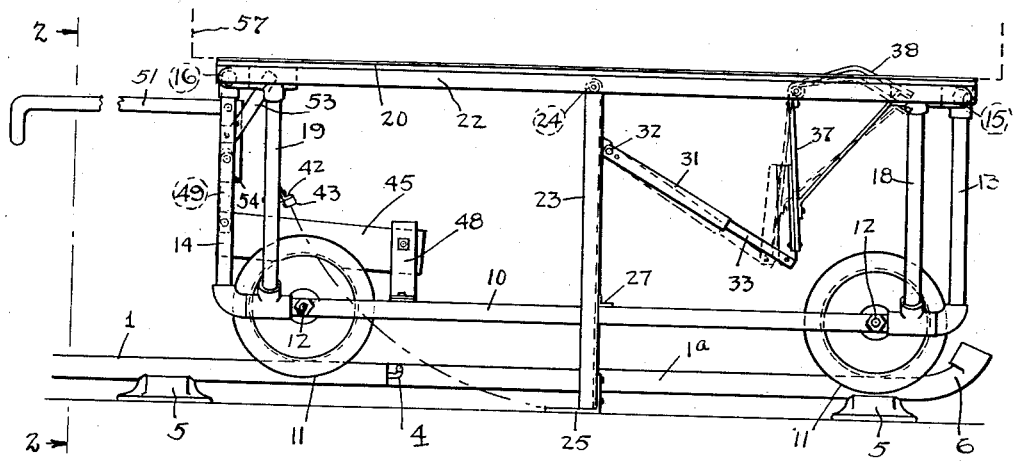

April 15, 1941.　　　　A. C. SAXTON　　　　2,238,569
APPARATUS FOR TRANSPORTING CASKETS AND THE LIKE
Filed July 28, 1938　　　3 Sheets-Sheet 1

INVENTOR.
Arthur C. Saxton
BY Fay, Oberlin & Fay
ATTORNEYS

April 15, 1941. A. C. SAXTON 2,238,569
APPARATUS FOR TRANSPORTING CASKETS AND THE LIKE
Filed July 23, 1938 3 Sheets-Sheet 2

INVENTOR.
Arthur C. Saxton.
BY Fay, Oberlin & Fay
ATTORNEYS.

April 15, 1941.  A. C. SAXTON  2,238,569
APPARATUS FOR TRANSPORTING CASKETS AND THE LIKE
Filed July 28, 1938  3 Sheets-Sheet 3

INVENTOR.
Arthur C. Saxton
BY Fay, Oberlin & Fay
ATTORNEYS

Patented Apr. 15, 1941

2,238,569

UNITED STATES PATENT OFFICE 2,238,569

APPARATUS FOR TRANSPORTING CASKETS AND THE LIKE

Arthur C. Saxton, Lakewood, Ohio

Application July 28, 1938, Serial No. 221,755

5 Claims. (Cl. 105—141)

The present invention relates to a novel apparatus for transporting relatively heavy, bulky objects such as caskets, vaults, large boxes, packing cases and the like. The invention is particularly adapted for use in transporting caskets in cemeteries from the hearse to the grave.

In recent years, the tendency in the funeral and undertaking art has been to make caskets of increased weight, primarily due to the fact that it has been the object of the art to provide more durable and higher quality equipment. Accordingly, present day caskets are constructed of relatively heavy materials such as bronze, steel and cast iron. As a result, modern caskets will be found to weigh several hundred pounds, and the carrying of such caskets a distance of sometimes several hundred feet from the hearse to the grave is fraught with difficulties; particularly when it is necessary to traverse uneven terrain or when the ground is in wet or slippery condition from rain or snow.

In order to eliminate these indicated difficulties, my invention, briefly outlined, provides a monorail, separable section track adapted to be laid between the points between which the casket is to be transported. Such monorail track being of sufficient flexibility to conform itself to the contours of the ground; and as a casket carrying vehicle for such track, my invention provides a framework having single track wheels adapted to securely engage with the track and a platform for the reception of the casket or the like.

The operators of my apparatus which in the specific instance of a funeral are of course the pall bearers, then merely are required to push the casket and the truck or vehicle along the track and to hold it in vertical position. Thus the effort required is only a small fraction of that heretofore needed to carry the casket bodily.

A further object of my invention is to provide means, automatically actuated by the positioning of the casket on the truck and by the forward movement of the truck for releasing supporting legs, which when the truck is not in casket carrying operation, serve to maintain the truck in upright position on the track. Since the operation of such supporting legs is partially dependent upon the movement of the truck, I also provide, in cooperation therewith, a braking means for holding or locking the truck against movement. My invention alternatively provides truck supporting means consisting of "out-rigger" wheels normally spaced from the ground level and adapted to contact with the ground to support the truck laterally when it is slightly tipped sideways either to one side or the other. Additional objects and advantages of my invention shall become apparent as the following description proceeds.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figures 2, 6:
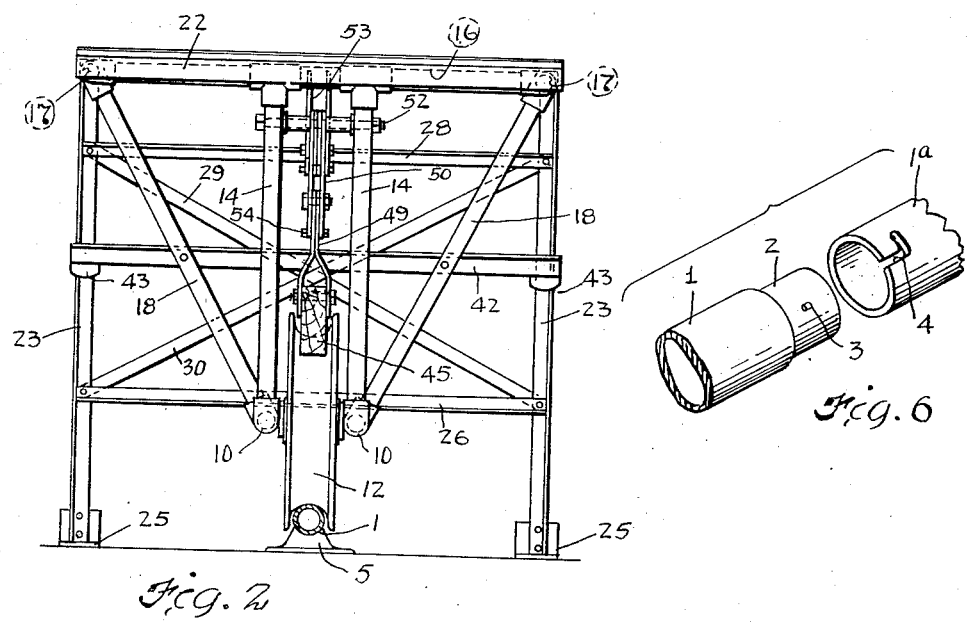
Figure 4:
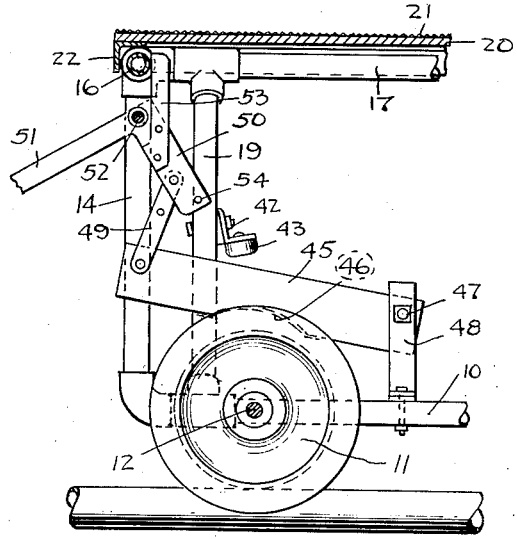
Figure 5:
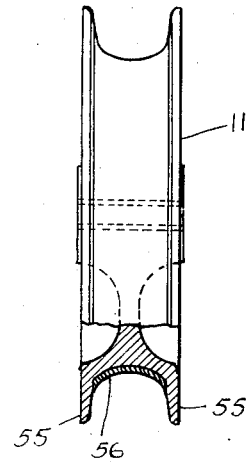
Figure 3:
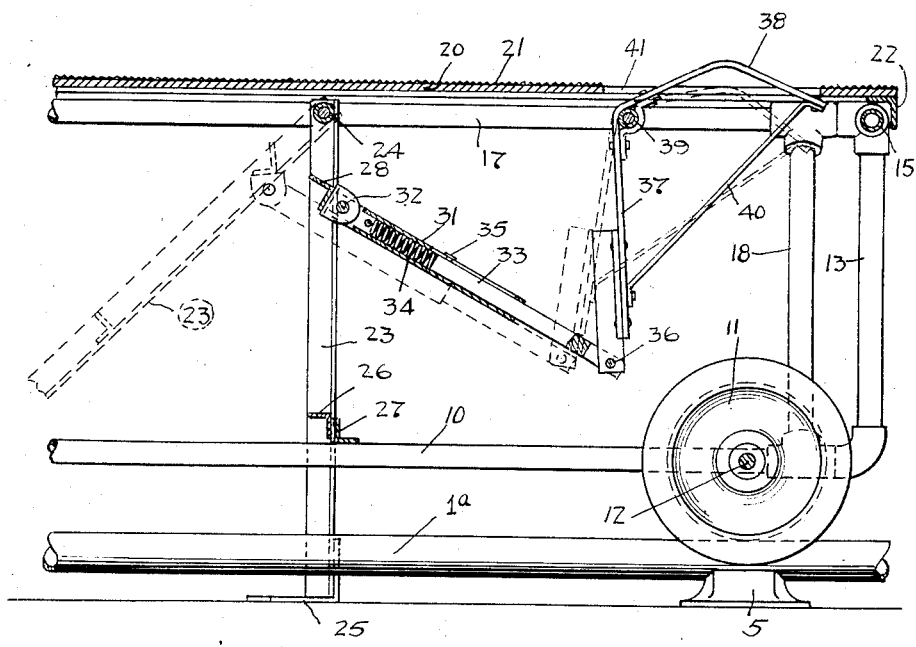
Figure 7:
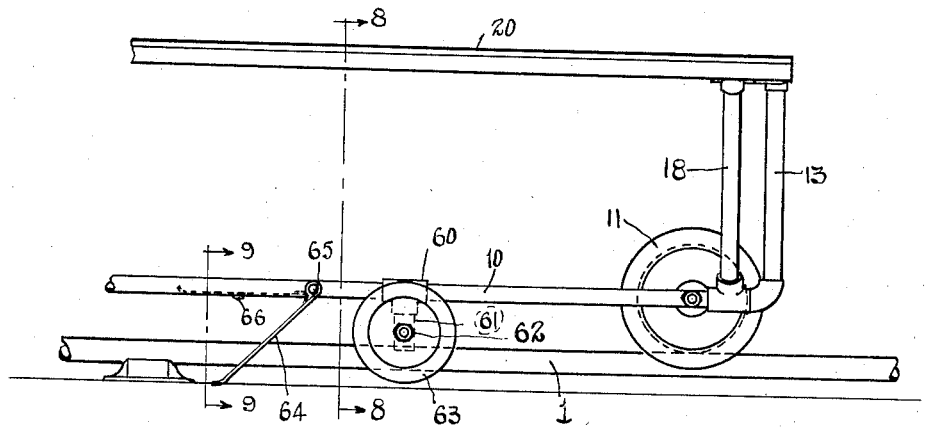
Figure 8:
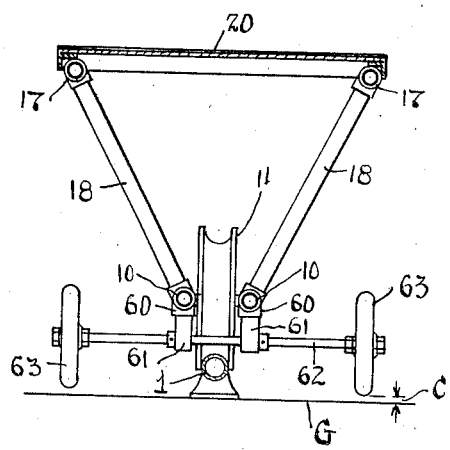
Figure 9:
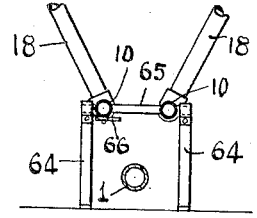

In said annexed drawings:

Fig. 1 is a side elevational view of the apparatus embodying the principle of my invention; Fig. 2 is an end elevation taken along the line 2—2 of Fig. 1; Fig. 3 is an enlarged, partially sectioned elevational view of the right hand portion of the casket carrying truck and showing in greater detail the construction of the supporting legs and actuating levers; Fig. 4 is an enlarged, partially sectioned view of the left hand portion of the casket carrying truck and showing in greater detail the construction of the brake; Fig. 5 is an enlarged, partially sectioned detailed view of a truck wheel; Fig. 6 is a perspective view showing the monorail track joint; Fig. 7 is a side elevational view of a portion of the apparatus and illustrating the construction of the alternative "out-rigger" wheel supporting means; Fig. 8 is a sectional elevation taken substantially along line 8—8 of Fig. 7; and Fig. 9 is a partial section taken substantially along line 9—9 of Fig. 7.

Now referring more particularly to the drawings, there is shown therein a monorail track consisting of the separable sections 1 and 1a. These sections are preferably of tubular section and composed of a strong material such as high carbon steel. The tubular cross section renders track laying very easy and provides an efficient support for grooved wheels. Equivalent cross-sectional shapes and forms of the rail sections can obviously be employed without violating the spirit and scope of my invention; the rail sections 1 and 1a are removably and separably secured together by means of a suitable joint, such as the bayonet joint illustrated in Fig. 6 in which a reduced diameter portion 2 on the section 1 is adapted to telescopically fit within the end of the section 1a and the bayonet stud 3 engages with the bayonet or L-shaped slot 4. Supporting pedestals 5 are located at spaced intervals along the under side of the rail sections 1 and 1a and function to hold the track in non-rotative position so that the bayonet joints will not work loose, and also to prevent the track from sinking into the ground. The rail section 1a is illustrated as one of the terminal ends of the monorail track and has an upwardly curved wheel stop 6 which prevents the truck from running off the end of the track.

The vehicle or truck is fabricated chiefly of tubular framework, comprising the two longitudinal, horizontally extending lower frame members 10 mounting the wheels 11 upon the axles 12. Vertical frame members 13 extend from the right hand or forward end of the frame members 10 to the upper horizontal frame member 15. Similar vertical frame members 14 join the left hand or rear end of the lower horizontal frame members 10 to the upper horizontal frame members 16. The frame members 15 and 16 are in turn joined by the upper longitudinal horizontal frame members 17. Vertically inclined frame members 18 and 19 extend from the lower frame members 10 to the upper frame members 17, thus forming as will best be seen in Fig. 2, a triangularly shaped framework (as viewed from the end) carrying the supporting wheels 11 at the apex and the casket carrying platform 20 at the base.

The casket carrying platform 20 may have a suitable non-slip surface covering such as the corrugated rubber matting 21. Angle bars 22 extend around the margin of the platform 20 and engage with the upper frame members 15, 16 and 17, being secured thereto in any suitable fashion such as by bolts, rivets or spot welds.

A pair of supporting legs 23 are pivotally mounted at their upper ends upon the upper frame members 17, and on their lower ends they carry the supporting feet or ground contacting elements 25. A transverse brace 26 extends between the supporting legs 23 and is adapted to contact with a limit stop bar 27 attached to the two horizontal lower frame members 10. An upper transverse brace 28 is also provided between the legs 23, as well as the angular trusses 29 and 30.

A tubular link arm 31 is pivotally connected to the upper cross-bar 28 as indicated at 32. The bar 33 telescopically fits within the tubular arm 31 and makes a yieldable or compressible engagement therewith through the medium of the compression spring 34. The movement of the bar 33 within the tubular arm 31 is limited by reason of the stud or pin 35 moving within a longitudinal slot in the arm 31. The bar 33 is pivotally connected as at 36 to the arm 37 of the trip lever 38 which is pivotally mounted to the upper frame lever 17 as indicated at 39. A brace 40 extends between the arm 37 and the lever 38 and imparts rigidity and strength thereto. As will best be seen in Fig. 3, an opening 41 is provided in the platform 20 for the upward extension of the lever 38 above the surface of the platform. The right hand end of the lever 38 is adapted to engage with the right hand edge of the opening 41 in order to limit the upward movement of the former.

A cross bar 42 is mounted upon the angular frame members 19 and carries the rubber pads 43 at each end which are adapted to serve as limit stops for the upward pivotal movement of the supporting legs 23.

A brake bar 45 has a concave portion 46 adapted to contact with the web or tread of the wheel 11. The brake bar is pivotally mounted at 47 to the uprights 48 carried by the lower horizontal frame members 10. The other or left hand end of the brake bar 45 is connected by means of the toggle link 49 to the arm 50 of the brake lever 51 which is pivotally mounted at 52 upon the vertical frame members 14. A limit stop arm 53 is rigidly secured to the lever arm 50 and adapted to contact with the inside of the frame member 16 to limit the downward or releasing movement of the brake lever 51. As will be seen from Fig. 2, the brake lever arm 50 is of bifurcated form fitting over the toggle link arm 49, and carries a limit pin 54 which is adapted to bear against and hold the toggle link 49 in locked position as soon as the pivot points of the latter have just passed "dead center" position.

Referring to Fig. 5, the wheels 11 have the double spaced flanges 55 adapted to fit over the sides of the monorail track sections 1 and 1a. A rubber tread 56 is molded or vulcanized to the intermediate or web portion of the wheel and serves the purpose of cushioning and quieting the movement of the wheels over the track.

When the above described apparatus is in position for use, its parts will be disposed as indicated in Fig. 1 wherein the supporting legs 23 are in vertical position with their lower ends or feet 24 in contact with the ground, thus holding the truck in vertical, upright position upon the monorail track, and the brake lever 51 will be in locked position holding the wheels against movement in either direction. As soon as the casket or similar object (indicated by the dotted lines 57 in Fig. 1) is placed upon the platform 20, the trip lever 38 will be depressed to the position shown in dotted lines in Fig. 1, whereby the bar 33, through its yieldable, spring connection with the tubular arm 31 will tend to pivotally rotate the supporting legs 23 in a clockwise direction and correspondingly to raise the feet 25 off the ground. But the stress of the spring 34 is of such amount that it will not be sufficient to overcome the contacting resistance which the feet 25 make upon the ground, but is sufficient to raise the legs 23 against their own weight. So when the brake lever 51 is released and the truck moved in a right hand or forward direction, the supporting legs will then be moved into position up against the rubber stops 43. Similarly, when the casket is removed from the platform 20, the trip lever 38 will move up through the opening 41 and permit the legs 23 to return to supporting position.

In the alternative form of truck supporting means shown in Figs. 7, 8 and 9, the previously described supporting legs 23 and cooperating mechanism are omitted and their place taken by the "out-rigger" wheel supporting means. Directing attention to Fig. 7, a pair of T-fittings 60 are mounted upon the horizontal lower frame members 10 at a point approximately intermediate the ends of the latter. The T-fittings 60 carry the downwardly extending axle supporting members 61. The lower ends of the members 61 fixedly mount the axle 62 upon whose outer ends the "out-rigger" wheels 63 are journalled. The wheels 63 are preferably rubber tired and in substantial vertical alignment with the upper horizontal frame members 17. The outer diameter or tread of the wheel 63 is such that in normal position a slight clearance C is provided with the ground level G. This clearance is suitably one-half of an inch more or less.

As shown in Figs. 7 and 9, I also provide a

"downhill brake" consisting of the rigid ground contacting arms 64 whose upper ends are secured to the cross shaft 65 pivotally mounted through the horizontal frame members 10. A suitable latch, which may be in the form of an ordinary centrally pivoted bar or "turn catch" 66 is mounted on the under side of one of the frame members 10 and adapted to hold the arms 64 in non-operative position, as shown by the dotted lines in Fig. 7. The last described means in operation thus serves to automatically brake and hold the truck from moving in a left-hand rearward direction and is particularly beneficial when the casket carrying truck is being moved up an incline. The braking leg 64 will automatically "bite" into the ground whenever the forward movement of the truck is stopped on an incline, for example, and when a slight rearward movement takes place.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A truck for transporting caskets and the like comprising a frame, a casket carrying platform and single track wheels carried by said frame, ground contacting supporting legs extending downwardly from each side of said frame, the upper ends of said legs being pivotally attached to said frame whereby the lower ends of said legs are movable into a vertical position in contact with the ground, and means carried by said frame and operable by the positioning of the casket on said platform for pivotally moving said legs out of ground contacting position.

2. A truck for transporting caskets and the like comprising a frame, a casket carrying platform and single track wheels carried by said frame, ground contacting supporting legs extending downwardly from each side of said frame, the upper ends of said legs being pivotally attached to said frame whereby the lower ends of said legs are movable into a vertical position in contact with the ground, means carried by said frame and operable by the positioning of the casket on said platform for pivotally moving said legs out of ground contacting position, and stop means carried by said frame for limiting the pivotal movement of said legs.

3. A truck for transporting caskets and the like comprising a frame, a casket carrying platform and single track wheels carried by said frame, ground contacting supporting legs extending downwardly from each side of said frame, the upper ends of said legs being pivotally attached to said frame whereby the lower ends of said legs are movable into a vertical position in contact with the ground, a trip lever carried by said frame and adapted to extend above the surface of said platform, and yieldable means carried by said frame and connecting said trip lever to said legs at a point removed from the point of pivotal attachment of the latter.

4. A truck for transporting caskets and the like comprising a frame, a casket carrying platform and single track wheels carried by said frame, ground contacting supporting legs extending downwardly from each side of said frame, the upper ends of said legs being pivotally attached to said frame whereby the lower ends of said legs are movable into a vertical position in contact with the ground, means carried by said frame and operable by the positioning of the casket on said platform for pivotally moving said legs out of ground contacting position, and braking means carried by said frame for holding said wheels against movement.

5. A truck for transporting caskets and the like comprising a frame, a casket carrying platform and single track wheels carried by said frame, ground contacting supporting legs extending downwardly from each side of said frame, the upper ends of said legs being pivotally attached to said frame whereby the lower ends of said legs are movable into a vertical position in contact with the ground, a trip lever carried by said frame and adapted to extend above the surface of said platform, yieldable means connecting said trip lever to said legs at a point removed from the point of pivotal attachment of the latter, and braking means carried by said frame for holding said wheels against movement.

ARTHUR C. SAXTON.